United States Patent [19]

Epting

[11] Patent Number: 5,322,676

[45] Date of Patent: * Jun. 21, 1994

[54] PROCESS FOR PRODUCING FURNACE ATMOSPHERES USING NONCRYOGENICALLY GENERATED NITROGEN

[75] Inventor: Michael J. Epting, Palm Harbor, Fla.

[73] Assignee: Air Products and Chemicals, Inc., Allentown, Pa.

[*] Notice: The portion of the term of this patent subsequent to Jun. 22, 2010 has been disclaimed.

[21] Appl. No.: 995,656

[22] Filed: Dec. 22, 1992

[51] Int. Cl.$^5$ .............................. C01B 21/04
[52] U.S. Cl. .................... 423/351; 148/230; 148/238
[58] Field of Search ............... 148/230, 238; 423/351

[56] References Cited

U.S. PATENT DOCUMENTS

| | | | |
|---|---|---|---|
| 3,379,507 | 4/1968 | Becker et al. | 23/288 |
| 3,598,538 | 8/1971 | Peacock | 23/281 |
| 4,179,407 | 12/1979 | Iiyama | 252/446 |
| 4,605,579 | 10/1990 | Campbell | 423/351 |
| 4,704,267 | 11/1987 | Dimartino | 423/351 |

FOREIGN PATENT DOCUMENTS

| | | |
|---|---|---|
| 4556189 | 11/1989 | Australia . |
| 4556289 | 11/1989 | Australia . |
| 2639249 | 5/1990 | France . |
| 2639251 | 5/1990 | France . |

OTHER PUBLICATIONS

P. Murzyn & L. Flores, Jr., Carburizing with Membrane $N_2$: process and quality issues, Mar. 1988, pp. 28-32.

H. Walton, New Method of Generating Nitrogen for Controlled Atmosphere Heat Treatment at Torrington Shiloh Plant, Mar. 1986 pp. 40-46.

P. F. Stratton, The Use of Non-Cryogenically Produced Nitrogen in Furnace Atmospheres, 1989, pp. 63-67.

D. J. Bowe & D. L. Fung, How PSA Nitrogen Works in a Heat Treating Shop, pp. 30-33, no date.

*Primary Examiner*—Wayne Langel
*Attorney, Agent, or Firm*—James C. Simmons; William F. Marsh

[57] ABSTRACT

A process for producing low-cost furnace atmospheres suitable for annealing and heat treating ferrous and nonferrous metals and alloys, brazing metals and ceramics, sealing glass to metal, and sintering metal and ceramic powders in a continuous furnace equipped with an ammonia dissociator from non-cryogenically produced nitrogen containing from 0.05 to 5.0% residual oxygen is presented. The disclosed process involves mixing non-cryogenically produced nitrogen with a pre-determined amount of a reducing gas such as hydrogen, ammonia, a C, H, and O containing hydrocarbon such as an alcohol, an ether, etc., or a mixture thereof, passing the mixture through an ammonia dissociator and converting the residual oxygen to an acceptable form such as moisture, carbon monoxide, carbon dioxide, or mixture thereof, and using the resultant gaseous mixture for annealing and heat treating ferrous and nonferrous metals and alloys, brazing metals and ceramics, sealing glass to metal, and sintering metal and ceramic powders.

8 Claims, No Drawings

PROCESS FOR PRODUCING FURNACE ATMOSPHERES USING NONCRYOGENICALLY GENERATED NITROGEN

FIELD OF THE INVENTION

The present invention pertains to producing controlled atmospheres in heat treating furnaces.

BACKGROUND OF THE INVENTION

Nitrogen-based atmospheres have been routinely used by the heat treating industry both in batch and continuous furnaces since the mid-nineteen seventies. Because of the low dew point and virtual absence of oxygen, nitrogen-based atmospheres do not exhibit oxidizing and decarburizing properties and are therefore suitable for a variety of heat treating operations. More specifically, a mixture of nitrogen and hydrogen has been extensively used for annealing of low to high carbon and alloy steels, annealing of non-ferrous metals and alloys such as copper, copper alloys, gold alloys, and sintering metal and ceramic powders. Mixtures of nitrogen and a hydrocarbon gas such as methane and propane have gained wide acceptance for neutral hardening and decarburized-free annealing of medium to high carbon steels. Nitrogen and methanol mixtures have been developed and used for carburizing low to medium carbon steels. Finally, a mixture of nitrogen, hydrogen, and/or moisture has been used for brazing metals and sealing glass to metals.

A portion of nitrogen used by the heat treating industry is produced by distillation of air in large cryogenic plants. Likewise, a portion of hydrogen used by the heat treating industry is produced by either partial oxidation or steam reforming of natural gas. Both nitrogen and hydrogen produced by these techniques are generally very expensive. Furthermore, the nitrogen-hydrogen atmospheres required for a variety of annealing, heat treating, brazing, sealing, and sintering operations and prepared by blending these gases are also very expensive. To reduce cost, a large number of heat treaters have been producing nitrogen-hydrogen atmospheres by decomposing (or cracking) ammonia in ammonia dissociators. Ammonia dissociators located remotely have been employed in some cases to generate nitrogen-hydrogen atmospheres for a variety of heat treating operations. In other cases, ammonia dissociators have been integrated with furnaces to save floor space and to improve overall thermal efficiency.

Ammonia dissociators generally decompose ammonia into a mixture of nitrogen and hydrogen over a bed of nickel, iron, or nickel/iron catalyst supported on a ceramic material. U.S. Pat. Nos. 3,598,538, 3,379,507, 4,179,407 disclose details of ammonia dissociators. The catalyst normally promotes the following ammonia dissociation reaction:

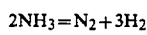

$2NH_3 = N_2 + 3H_2$

This reaction is endothermic and requires heating of the catalyst bed from an outside source generally to temperatures ranging from 600° C. to 950° C. Operating pressure in the unit generally ranges from 2 psig to 100 psig, and the space velocity used for the dissociation reaction generally varies from 500 to 5,000 Nm³/h product gas per m³ of the catalyst. The product gas generally contains a mixture of 25% nitrogen and 75% hydrogen with small quantities of residual ammonia measured in PPM. Since the dissociation reaction is correlated to the thermodynamic equilibrium, the content of unconverted ammonia in the product gas can vary from 30 ppm to 500 ppm depending on the operating temperature, pressure, and space velocity.

The concentration of hydrogen in nitrogen-hydrogen atmospheres required for the majority of heat treating operations generally varies from about 0.5 to about 25%. Since cryogenically produced nitrogen is cheaper than nitrogen-hydrogen atmosphere produced by dissociating ammonia, heat treaters blend nitrogen with dissociated ammonia product gas to reduce overall atmosphere cost and to produce nitrogen-hydrogen atmosphere with the desired composition. However, these heat treaters are still experiencing the dilemma of high nitrogen-hydrogen atmosphere cost. Furthermore, it is increasingly becoming difficult for them to compete effectively in the open world market.

Since the concentration of nitrogen in nitrogen-hydrogen atmospheres varies from about 75% to 99.5%, it is conceivable to reduce the overall cost of nitrogen-hydrogen atmospheres by using low-cost nitrogen produced by non-cryogenic air separation techniques such as pressure swing adsorption (PSA) and selective permeation (membrane separation). The non-cryogenically produced nitrogen costs less to produce, however it contains from 0.05 to 5.0% residual oxygen, making a direct substitution of cryogenically produced nitrogen with non-cryogenically produced nitrogen very difficult.

Furnace atmospheres suitable for heat treating applications have been generated from non-cryogenically produced nitrogen by removing residual oxygen or converting it to an acceptable form in external units prior to feeding the atmospheres into the furnaces. Such atmosphere generation methods have been described in detail in French publication numbers 2,639,249 and 2,639,251 dated 24 November 1988 and Australian patent application numbers AU45561/89 and AU45562/89 dated 24 Nov. 1988. These methods require use of external units packed with expensive precious metal catalysts such as palladium and platinum. The use of an external unit considerably increases the cost of noncryogenically produced nitrogen and that of nitrogen-hydrogen atmosphere. Thus, heat treaters with continuous furnaces equipped with ammonia dissociators have not converted to non-cryogenically produced nitrogen.

It is clear that there is a need to switch from cryogenically produced nitrogen to non-cryogenically produced nitrogen for reducing the overall cost of nitrogen-hydrogen atmospheres for heat treating in continuous furnaces equipped with ammonia dissociators.

SUMMARY OF THE INVENTION

The present invention pertains to a process for producing low-cost furnace atmospheres suitable for annealing and heat treating ferrous and nonferrous metals and alloys, brazing metals and ceramics, sealing glass to metal, and sintering metal and ceramic powders in a continuous furnace from non-cryogenically produced nitrogen containing from 0.05 to 5.0% residual oxygen. According to the process, suitable atmospheres are produced by mixing non-cryogenically produced nitrogen with a pre-determined amount of a reducing gas such as hydrogen, ammonia, a C, H, and O containing hydrocarbon such as alcohols, ethers, etc., or a mixture thereof, passing the mixture through an ammonia dissociator operating between 100° C. and 950° C., converting residual oxygen to an acceptable form such as moisture, carbon monoxide, carbon dioxide, or mixture thereof, and using the resultant gaseous mixture in continuous furnaces for annealing and heat treating ferrous and nonferrous metals and alloys, brazing metals and ceramics, sealing glass to metal, and sintering metal and ceramic powders. The process is most suitable for generating atmospheres used in continuous furnaces equipped with ammonia dissociators, which help in catalytically converting residual oxygen with a reducing gas to an acceptable form and reducing the residual oxygen level to below about 10 ppm. Because an ammonia dissociator is available either as an integral part of the furnace or as a stand alone unit, the process eliminates the need of an external and expensive precious metal catalytic unit for converting residual oxygen to an acceptable form.

According to one embodiment of the invention, bright annealing of copper or copper alloys and sintering of copper or copper alloy powders are carried out in a continuous furnace using a mixture of non-cryogenically produced nitrogen and hydrogen or vaporized ammonia. Prior to feeding the gaseous feed mixture to the furnace, it is passed through an ammonia dissociator to convert residual oxygen to moisture. The flow rate of hydrogen or ammonia mixed with the non-cryogenically produced nitrogen is controlled in a way that it is always greater than the stoichiometric amount required for complete conversion of residual oxygen to moisture.

According to another embodiment of the invention, oxide-free and bright annealing of gold alloys is carried out in a continuous furnace using a mixture of non-cryogenically produced nitrogen and hydrogen or vaporized ammonia. Prior to feeding the gaseous feed mixture to the furnace, it is once again passed through an ammonia dissociator to convert residual oxygen to moisture. The flow rate of hydrogen or ammonia mixed with the non-cryogenically produced nitrogen is controlled in a way that $pH_2/pH_2O$ ratio in the ammonia dissociator effluent stream is not oxidizing to gold and gold alloys.

According to another embodiment of the invention, controlled, tightly packed oxide annealing without any scaling and rusting of low to high carbon and alloy steels is carried out in a continuous furnace using a mixture of non-cryogenically produced nitrogen and hydrogen or vaporized ammonia. Prior to feeding the gaseous feed mixture to the furnace, it is once again passed through an ammonia dissociator to convert residual oxygen to moisture. The flow rate of hydrogen or ammonia mixed with the non-cryogenically produced nitrogen is controlled in a way that $pH_2/pH_2O$ ratio in the ammonia dissociator effluent stream is oxidizing to low to high carbon and alloy steels.

According to another embodiment of the invention, bright, oxide-free and partially decarburized annealing of low to high carbon and alloy steels is carried out in a continuous furnace using a mixture of non-cryogenically produced nitrogen and hydrogen or vaporized ammonia. Prior to feeding the gaseous feed mixture to the furnace, it is once again passed through an ammonia dissociator to convert residual oxygen to moisture. The flow rate of hydrogen or ammonia mixed with the non-cryogenically produced nitrogen is controlled in a way that $pH_2/pH_2O$ ratio in the ammonia dissociator effluent stream is not oxidizing to low to high carbon and alloy steels.

According to another embodiment of the invention, brazing metals and ceramics, sealing glass to metals, sintering metal and ceramic powders, ceramic co-firing, ceramic metallization, and annealing of nonferrous metals and alloys are carried in a continuous furnace using a mixture of non-cryogenically produced nitrogen and hydrogen or vaporized ammonia. Prior to feeding the gaseous feed mixture to the furnace, it is passed through an ammonia dissociator to convert residual oxygen to moisture. The flow rate of hydrogen or ammonia mixed with the non-cryogenically produced nitrogen is controlled in a way that $pH_2/pH_2O$ ratio in the ammonia dissociator effluent stream is not oxidizing to the materials processed in the above described operations.

According to yet another embodiment of the invention, bright annealing of copper or copper alloys and sintering of copper or copper alloy powders are carried out in a continuous furnace using a mixture of non-cryogenically produced nitrogen and a C, H, and O containing hydrocarbon. Prior to feeding the gaseous feed mixture to the furnace, it is passed through an ammonia dissociator to convert residual oxygen to moisture, carbon monoxide, carbon dioxide, or mixture thereof. The flow rate of hydrocarbon mixed with the non-cryogenically produced nitrogen is controlled in a way that it is always greater than the amount required for complete conversion of residual oxygen to a mixture of moisture and carbon dioxide.

According to yet another embodiment of the invention, oxide-free and bright annealing of gold alloys is carried out in a continuous furnace using a mixture of non-cryogenically produced nitrogen and a C, H, and O containing hydrocarbon. Prior to feeding the gaseous feed mixture to the furnace, it is once again passed through an ammonia dissociator to convert residual oxygen to moisture, carbon monoxide, carbon dioxide, or mixture thereof. The flow rate of hydrocarbon mixed with the non-cryogenically produced nitrogen is controlled in a way that $pH_2/pH_2O$ and $pCO/pCO_2$ ratios in the ammonia dissociator effluent stream are not oxidizing to gold and gold alloys.

According to yet another embodiment of the invention, controlled, tightly packed oxide annealing without any scaling and rusting of low to high carbon and alloy steels is carried out in a continuous furnace using a mixture of non-cryogenically produced nitrogen and a C, H, and O containing hydrocarbon. Prior to feeding the gaseous feed mixture to the furnace, it is once again passed through an ammonia dissociator to convert residual oxygen to moisture, carbon monoxide, carbon dioxide, or mixture thereof. The flow rate of hydrocarbon mixed with the non-cryogenically produced nitrogen is controlled in a way that $pH_2/pH_2O$ ratio or $pCO/pCO_2$ ratio or both in the ammonia dissociator effluent stream are oxidizing to low to high carbon and alloy steels.

According to yet another embodiment of the invention, bright, oxide-free and partially decarburized, oxide-free and decarburized-free, and oxide-free and partially carburized annealing of low to high carbon and alloy steel s are carried out in a continuous furnace using a mixture of non-cryogenically produced nitrogen and a C, H, and O containing hydrocarbon. Prior to feeding the gaseous feed mixture to the furnace, it is once again passed through an ammonia generator to convert residual oxygen to moisture, hydrogen, carbon monoxide, carbon dioxide, or mixture thereof. The flow rate of hydrocarbon mixed with the non-cryogenically produced nitrogen is controlled in a way that $pH_2/pH_2O$ and $pCO/pCO_2$ ratios in the ammonia dissociator effluent stream are not oxidizing to low to high carbon and alloy steels.

According to yet another embodiment of the invention, brazing metals and ceramics, sealing glass to metals, sintering metal and ceramic powders, ceramic cofiring, ceramic metallization, and annealing of nonferrous metals and alloys are carried in a continuous furnace using a mixture of non-cryogenically produced nitrogen and a C, H, and O containing hydrocarbon. Prior to feeding the gaseous feed mixture to the furnace, it is passed through an ammonia dissociator to convert residual oxygen to moisture, carbon monoxide, carbon dioxide, or mixture thereof. The flow rate of hydrocarbon mixed with the non-cryogenically produced nitrogen is controlled in a way that $pH_2/pH_2O$ and $pCO/pCO_2$ ratios in the ammonia dissociator effluent stream are not oxidizing to the materials processed in the above described operations.

The key features of the process of the present invention include the use of 1) an ammonia dissociator that helps in converting residual oxygen present in non-cryogenically produced nitrogen to an acceptable form prior to introducing gaseous feed mixture into the furnace and 2) sufficient amount of hydrogen, ammonia, or a C, H, and O containing hydrocarbon in the gaseous feed mixture such that the desired ratio of $pH_2/pH_2O$ or ratios of $pH_2/pH_2O$ and $pCO/pCO_2$ are produced in the effluent stream of the said ammonia dissociator. This process is particularly suitable for generating atmospheres used in continuous furnaces equipped with ammonia dissociator.

DETAILED DESCRIPTION OF THE INVENTION

The present invention relates to a process for generating low-cost atmospheres suitable for annealing and heat treating ferrous and nonferrous metals and alloys in continuous furnaces equipped with ammonia dissociators using non-cryogenically produced nitrogen and hydrogen, ammonia, a C, H, and O containing hydrocarbon, or a mixture thereof. The process of the present invention is based on the surprising discovery that atmospheres suitable for annealing and heat treating ferrous and nonferrous metals and alloys, brazing metals and ceramics, sealing glass to metal, and sintering metal and ceramic powders can be generated in a continuous furnace equipped with an ammonia dissociator by mixing non-cryogenically produced nitrogen with sufficient amount of a reducing gas such as hydrogen, ammonia, a C, H, and O containing hydrocarbon, or a mixture thereof, passing the feed mixture through the ammonia dissociator to convert substantially all the residual oxygen present in the non-cryogenically produced nitrogen to an acceptable form such as moisture, carbon monoxide, carbon dioxide, or mixture thereof, and using the resultant gaseous mixture for the above mentioned operations.

With the advent of non-cryogenic technologies for air separation, it is now possible to produce nitrogen-hydrogen atmospheres at low cost. The non-cryogenically produced nitrogen, however, is contaminated with up to 5% residual oxygen, which is generally undesirable for many heat treating applications. The presence of residual oxygen has made the direct substitution of cryogenically produced nitrogen in nitrogen-hydrogen atmospheres with that produced by non-cryogenic techniques very difficult.

Several attempts to substitute cryogenically produced nitrogen in nitrogen-hydrogen atmospheres with that produced non-cryogenically in continuous furnaces have met limited success. The metallic parts treated with non-cryogenically produced nitrogen-hydrogen atmospheres were always scaled, rusted, or heavily oxidized. These problems are believed to be related to exposure of parts at high temperatures with residual oxygen present in the non-cryogenically produced nitrogen.

According to the present invention scaling, rusting, and severe oxidation problems caused by residual oxygen present in the non-cryogenically produced nitrogen are surprisingly resolved by mixing non-cryogenically produced nitrogen with a pre-determined amount of a reducing gas such as hydrogen, ammonia, a C, H, and O containing hydrocarbon such as alcohols, ethers, etc., or a mixture thereof, passing the mixture through an ammonia dissociator and converting the residual oxygen to an acceptable form such as moisture, carbon monoxide, carbon dioxide, or mixture thereof prior to introducing the feed mixture into a continuous furnace. The key function of ammonia dissociator is to facilitate catalytic conversion of residual oxygen with either hydrogen, ammonia, or a hydrocarbon to an acceptable form. Ammonia dissociators generally contain a bed of nickel, iron, or nickel/iron catalyst supported on a ceramic material. To facilitate rapid reaction between residual oxygen and hydrogen, ammonia, or a hydrocarbon, the catalytic reactor is heated to a temperature ranging from 100° C. to 950° C. The operating pressure and the space velocity can be selected from 2 psig to about 100 psig and from 200 to 20,000 $Nm^3/h$ feed gas per $m^3$ of the catalyst, respectively. The flow rate of feed gas passed through ammonia dissociator will therefore depend on the size of the catalytic reactor.

If hydrogen is used as a reducing gas, it is preferable to heat the catalytic reactor to a temperature from about 100° C. to about 500° C. If a vaporized C, H, and O containing hydrocarbon is used as a reducing gas, it is preferable to heat the catalytic reactor from about 100° C. to about 600° C., more preferably from about 200° C. to about 500° C. It is believed that C, H, and O containing hydrocarbons at these temperatures would not only react with residual oxygen converting it to a mixture of moisture, carbon monoxide, and carbon dioxide, but also decompose to a carbon monoxide-hydrogen mixture. If vaporized ammonia is used as a reducing gas, it is preferable to heat the catalytic reactor from about 600° C. to about 950° C. It is believed that ammonia at these temperatures would not only react with residual oxygen converting it to moisture, but also decompose to a nitrogen-hydrogen mixture. Since the reaction between residual oxygen and hydrogen, ammonia, or a hydrocarbon is exothermic in nature, the amount of heat required to maintain the catalytic reactor temperature decreases with the onset of reaction. In fact, no external heat may be required in some cases once the reaction has been initiated depending upon the initial bed temperature, concentration of residual oxygen present in the non-cryogenically produced nitrogen, and the type of reducing gas selected for the reaction. Instead of heating the catalytic reactor, the feed non-cryogenically produced nitrogen and hydrogen, ammonia, or a hydrocarbon gaseous mixture can be heated and passed through the catalytic reactor to convert residual oxygen to an acceptable form.

A continuous furnace operated at atmospheric or above atmospheric pressure with separate heating and cooling zones is ideal for the present invention. The continuous furnace can be of the mesh belt, a roller hearth, a pusher tray, a walking beam, or a rotary hearth type. A furnace equipped with an ammonia dissociator is most suitable for the present invention.

A continuous furnace operated at atmospheric or above atmospheric pressure with a heating zone and an integrated quench cooling zone is also ideal for the present invention. The continuous furnace can be of the mesh belt, shaker, a roller hearth, a pusher tray, a shaker hearth, a rotary retort, or a rotary hearth type. A furnace equipped with an ammonia dissociator is most suitable for the present invention.

The residual oxygen in non-cryogenically produced nitrogen can vary from 0.05 to about 5%, preferably from about 0.05% to 3%, and, ideally, from about 0.1% to about 1.0%.

The hot effluent gas from the ammonia dissociator can be fed directly into the heated zone of a continuous furnace with a separate cooling zone or an integrated quench cooling zone, saving heating requirements for the furnace. The effluent gas can be used to pre-heat the gaseous feed mixture to the ammonia dissociator prior to introducing it into the heated zone of a continuous furnace, saving external heating requirements for the catalytic bed. The effluent gas can be cooled using a heat exchanger and fed into the transition zone located between the heating and cooling zone or the cooling zone of a continuous furnace with a separate cooling zone. Finally, the effluent gas can be divided into two or more streams and fed into the heating and cooling zones of a continuous furnace with a separate cooling zone. It can also be introduced into the furnace through multiple injection ports located in the heating and cooling zones.

The amount of hydrogen or ammonia gas used in the process of the present invention depends whether controlled oxidizing or reducing conditions are desired for the particular heat treating operation. For example, if controlled oxidizing condition is desired, the amount of hydrogen or ammonia is adjusted so that $pH_2/pH_2O$ ratio in the ammonia dissociator effluent stream is low enough that it is oxidizing to the material heat treated in the furnace. Likewise, if reducing condition desired, the amount of hydrogen or ammonia is adjusted so that $pH_2/pH_2O$ ratio in the ammonia dissociator effluent stream is high enough that it is reducing to the material being heat treated in the furnace.

A hydrocarbon gas or liquid containing C, H, and O from the group consisting of an alcohol such as methanol, ethanol, propanol, and butanol, an ether such as dimethyl ether, diethyl ether, and methyl ethyl ether, an aldehyde such as formaldehyde, acetaldehyde, and propionaldehyde, ketone, and acetone is selected as a reducing agent for converting residual oxygen to an acceptable form. Hydrocarbon gas can be simply mixed with the non-cryogenically produced nitrogen and fed to the ammonia dissociator. Hydrocarbon liquid is vaporized, mixed with the non-cryogenically produced nitrogen, and fed to the ammonia dissociator.

The amount of hydrocarbon gas or vaporized liquid used in the process of the present invention depends whether controlled oxidizing or reducing conditions are desired for the particular heat treating operation. For example, if controlled oxidizing condition is desired, the amount of hydrocarbon is adjusted in a way that $pH_2/pH_2O$ ratio or $pCO/pCO_2$ ratio or both in the ammonia dissociator effluent stream are low enough that they are oxidizing to the material being heat treated in the furnace. Likewise, if reducing condition desired, the amount of hydrocarbon is adjusted in a way that $pH_2/pH_2O$ and $pCO/pCO_2$ ratios in the ammonia dissociator effluent stream are high enough that they are reducing to the material being heat treated in the furnace.

Low to high carbon or alloy steels that can be heat treated according to the present invention can be selected from the groups 10XX, 11XX, 12XX, 13XX, 15XX, 40XX, 41XX, 43XX, 44XX, 47XX, 48XX, 50XX, 51XX, 61XX, 81XX, 86XX, 87XX, 88XX, 92XX, 92XX, 93XX, 50XXX, 51XXX, or 52XXX as described in Metals Handbook, Ninth Edition, Volume 4 Heat Treating, published by American Society for Metals. Tool steels selected from the groups AX, DX, HX, OX, MX, or SX, iron nickel based alloys such as Incoloy, nickel alloys such as Inconel and Hastalloy, nickel-copper alloys such as Monel, copper and copper alloys, gold alloys, and cobalt based alloys can be heat treated according to processes of this invention.

In order to demonstrate the invention a series of annealing tests were carried out in two different continuous conveyor belt furnaces with separate heating and cooling zones. One of the furnaces was equipped with an ammonia dissociator. These furnaces were equipped with physical curtains both on entry and exit sections to prevent air from entering the furnaces. The samples annealed in these furnaces were heated rapidly in the heating zone. They were also cooled rapidly as they moved out of the heating zone and entered the cooling zone. During the tests gaseous feed mixture was introduced either into the heating zone or the area between the heating and the cooling zones generally referred to as the transition zone. The feed mixture was passed through the furnace for at least one hour to purge the furnace prior to annealing the samples.

CONTROL EXAMPLE 1

Samples of type 102 copper alloy were annealed at 700° C. and 750° C. in a furnace not equipped with an ammonia dissociator using nitrogen containing 99.5% nitrogen and 0.5% oxygen. This composition of nitrogen is very similar to that typically produced by non-cryogenic air separation techniques such as PSAs and membranes. The feed gas introduced into the transition zone of the furnace.

The copper samples annealed in these experiments were heavily oxidized and scaled. The oxidation of the samples was due to the presence of high levels of oxygen both in the heating and cooling zones of the furnace.

This example showed that non-cryogenically produced nitrogen containing residual oxygen cannot be used to replace nitrogen-hydrogen mixture produced by dissociation of ammonia for bright annealing copper.

CONTROL EXAMPLE 2A

Example 1 was repeated using the same furnace, annealing temperatures, location of feed gas, and composition of non-cryogenically produced nitrogen with the exception of adding 1.2% hydrogen to the feed gas. The amount of hydrogen was 1.2 times stoichiometric amount required for converting residual oxygen completely to moisture.

The copper samples annealed in these experiments were heavily oxidized due to the presence of high levels of oxygen in the cooling zone of the furnace.

This example showed that non-cryogenically produced nitrogen containing residual oxygen cannot be used to replace nitrogen-hydrogen mixture produced by dissociation of ammonia for bright annealing copper even with the addition of more than stoichiometric amount of hydrogen.

CONTROL EXAMPLE 2B

Example 2A was repeated using the same copper alloy and similar operating conditions with the exception of using 10% hydrogen. This amount of hydrogen was ten times the stoichiometric amount required for the complete conversion of oxygen present in the feed nitrogen to moisture.

The copper samples annealed in this example were heavily oxidized due to the presence of high levels of oxygen in the cooling zone of the furnace.

This example showed that non-cryogenically produced nitrogen containing residual oxygen cannot be used to replace nitrogen-hydrogen mixture produced by dissociation of ammonia for bright annealing copper even with the addition of considerably more than stoichiometric amount of hydrogen.

CONTROL EXAMPLE 2C

Example 2A was repeated using the same furnace, annealing temperatures, composition of non-cryogenically produced nitrogen, and amount of hydrogen added to the feed gas with the exception of introducing the feed gas into the heating zone of the furnace instead of the transition zone. The amount of hydrogen was 1.2 times stoichiometric amount required for converting residual oxygen completely to moisture.

Although residual oxygen present in the feed nitrogen was converted to moisture, the copper samples annealed in these experiments were heavily oxidized due to the direct impingement of cold feed gas containing residual oxygen on the samples.

This example showed that non-cryogenically produced nitrogen containing residual oxygen cannot be used to replace nitrogen-hydrogen mixture produced by dissociation of ammonia for bright annealing copper even with the addition of more than stoichiometric amount of hydrogen and introduction of feed gas into the heating zone of the furnace.

CONTROL EXAMPLE 2D

Example 2C was repeated using similar operating conditions with the exception of using 10% hydrogen. This amount of hydrogen was ten times the stoichiometric amount required for the complete conversion of oxygen present in the feed nitrogen to moisture.

Although residual oxygen present in the feed nitrogen was once again converted to moisture, the copper samples annealed in this example were heavily oxidized due to the direct impingement of cold feed gas containing residual oxygen on the samples.

This example showed that non-cryogenically produced nitrogen containing residual oxygen cannot be used to replace nitrogen-hydrogen mixture produced by dissociation of ammonia for bright annealing copper even with the addition of more than stoichiometric amount of hydrogen and introduction of feed gas into the heating zone of the furnace.

CONTROL EXAMPLE 3A

Samples of 9-K gold alloy containing gold, silver, zinc, and copper were annealed at 750° C. in the furnace not equipped with an ammonia dissociator using non-cryogenically produced nitrogen containing 99.5% nitrogen and 0.5% residual oxygen. The feed gas mixed with 5% hydrogen and introduced was into the transition zone of the furnace.

The 9-K gold samples annealed in this example were heavily oxidized and scaled. The oxidation of the samples was due to the presence of high levels of oxygen both in the heating and cooling zones of the furnace.

This example showed that non-cryogenically produced nitrogen containing residual oxygen cannot be used to replace nitrogen-hydrogen mixture produced by dissociation of ammonia for bright annealing 9-K gold even with the addition of considerably more than stoichiometric amount of hydrogen.

CONTROL EXAMPLE 3B

Example 3A was repeated using the same furnace, annealing temperature, location of feed gas, and composition of non-cryogenically produced nitrogen with the exception of adding 10% hydrogen to the feed gas. The amount of hydrogen was 10 times stoichiometric amount required for converting residual oxygen completely to moisture.

The 9-K gold samples annealed in this example were heavily oxidized and scaled. The oxidation of the samples was due to the presence of high levels of oxygen both in the heating and cooling zones of the furnace.

This example showed that non-cryogenically produced nitrogen containing residual oxygen cannot be used to replace nitrogen-hydrogen mixture produced by dissociation of ammonia for bright annealing 9-K gold even with the addition of considerably more than stoichiometric amount of hydrogen.

The above control examples showed that both copper and gold alloys cannot be annealed in a continuous furnace using a mixture of non-cryogenically produced nitrogen and hydrogen even with the addition of excess amounts of hydrogen.

A number of copper, gold alloys, and carbon steel annealing experiments were carried out in a continuous furnace equipped with an ammonia dissociator to demonstrate the present invention. A feed mixture of non-cryogenically produced nitrogen and hydrogen was passed through catalytic reactor of the ammonia dissociator operated at approximately 925° C. The reactor facilitated reaction between residual oxygen present in non-cryogenically produced nitrogen and hydrogen, converting it to moisture. The feed mixture was preheated in a heat exchanger with hot effluent gas from the ammonia dissociation from the catalytic reactor. The effluent gas containing a mixture of nitrogen, unreacted hydrogen, moisture, and less than 5 ppm of residual oxygen was cooled in ambient air prior to introducing it into the transition or heating zone of the furnace. Effluent gas was passed through the furnace for at least one hour to purge the furnace prior to annealing the samples.

EXAMPLE 1

Samples of type 102 copper alloy were annealed at 760° C. in a furnace equipped with an ammonia dissociator using nitrogen containing 99.5% nitrogen and 0.5% oxygen and hydrogen mixture. The composition of nitrogen used in this example was very similar to that typically produced by non-cryogenic air separation techniques such as PSAs and membranes. The amount of hydrogen used in this example was about 4% by volume. The gaseous feed mixture was passed through the ammonia dissociator to convert residual oxygen to moisture. The effluent stream from the ammonia dissociator containing less than 5 ppm of oxygen was then introduced into the transition zone of the furnace.

The copper samples annealed in this example were bright without any signs of oxidation. This example therefore showed that a mixture of hydrogen and non-cryogenically produced nitrogen containing residual oxygen can be used to replace nitrogen-hydrogen mixture produced by dissociation of ammonia for bright annealing copper in a continuous furnace equipped with an ammonia dissociator.

EXAMPLE 2

Example 1 was repeated using the same furnace, annealing temperature, location of feed gas, and composition of non-cryogenically produced nitrogen with the exceptions of annealing 9-K and 14-K gold alloys and using 10% hydrogen. The gaseous feed mixture was once again passed through the ammonia dissociator to convert residual oxygen to moisture. The effluent stream from the ammonia dissociator containing less than 5 ppm of oxygen was then introduced into the transition zone of the furnace.

The samples of gold alloys annealed in this example were bright without any signs of oxidation. This example therefore showed that a mixture of hydrogen and non-cryogenically produced nitrogen containing residual oxygen can be used to replace nitrogen-hydrogen mixture produced by dissociation of ammonia for bright annealing gold alloys in a continuous furnace equipped with an ammonia dissociator.

EXAMPLE 3

Example 2 was repeated using the same furnace, samples, annealing temperature, location of feed gas, and composition of non-cryogenically produced nitrogen with the exception of using 5% hydrogen. The gaseous feed mixture was once again passed through the ammonia dissociator to convert residual oxygen to moisture. The effluent stream from the ammonia dissociator containing less than 5 ppm of oxygen was then introduced into the transition zone of the furnace.

The annealed samples of gold alloys were bright without any signs of oxidation. These results indicated that a $pH_2/pH_2O$ ratio of 4.0 in the effluent stream was high enough to be reducing to both 9-K and 14-K gold samples.

This example therefore showed that a mixture of hydrogen and non-cryogenically produced nitrogen containing residual oxygen can be used to replace nitrogen-hydrogen mixture produced by dissociation of ammonia for bright annealing gold alloys in a continuous furnace equipped with an ammonia dissociator provided that $pH_2/pH_2O$ ratio in the feed atmosphere to the furnace is high enough that it is reducing to gold alloys.

EXAMPLE 4

Example 2 was repeated using the same furnace, samples, annealing temperature, location of feed gas, and composition of non-cryogenically produced nitrogen with the exception of using 3% hydrogen. The gaseous feed mixture was once again passed through the ammonia dissociator to convert residual oxygen to moisture. The effluent stream from the ammonia dissociator containing less than 5 ppm of oxygen was then introduced into the transition zone of the furnace.

14-K gold samples annealed in this example were bright without any signs of oxidation. 9-K gold samples containing higher amounts of zinc than 14-K gold, on the other hand, showed some signs of surface oxidation. These results indicated that a $pH_2/pH_2O$ ratio of 2.0 in the effluent stream was high enough to be reducing to 14-K gold samples, but not high enough to be reducing to 9-K gold samples.

This example therefore showed that a mixture of hydrogen and non-cryogenically produced nitrogen containing residual oxygen can be used to replace nitrogen-hydrogen mixture produced by dissociation of ammonia for bright annealing gold alloys in a continuous furnace equipped with an ammonia dissociator provided that $pH_2/pH_2O$ ratio in the feed atmosphere to the furnace is high enough that it is reducing to gold alloys.

EXAMPLE 5

Example 3 was repeated using the same furnace, samples, annealing temperature, location of feed gas, and amount of hydrogen with the exception of using non-cryogenically produced nitrogen containing 99.25% nitrogen and 0.75% residual oxygen. The gaseous feed mixture was once again passed through the ammonia dissociator to convert residual oxygen to moisture. The effluent stream from the ammonia dissociator containing less than 5 ppm of oxygen was then introduced into the transition zone of the furnace.

14-K gold samples annealed in this example were bright without any signs of oxidation. 9-K gold samples, on the other hand, showed some signs of surface oxidation. These results indicated that a $pH_2/pH_2O$ ratio of 2.3 in the effluent stream was high enough to be reducing to 14-K gold samples, but not high enough to be reducing to 9-K gold samples.

This example therefore showed that a mixture of hydrogen and non-cryogenically produced nitrogen containing residual oxygen can be used to replace nitrogen-hydrogen mixture produced by dissociation of ammonia for bright annealing gold alloys in a continuous furnace equipped with an ammonia dissociator provided that $pH_2/pH_2O$ ratio in the feed atmosphere to the furnace is high enough that it is reducing to gold alloys.

EXAMPLE 6

Example 5 was repeated using the same furnace, samples, annealing temperature, location of feed gas, and amount of hydrogen with the exception of using non-cryogenically produced nitrogen containing 99.0% nitrogen and 1.0% residual oxygen. The gaseous feed mixture was once again passed through the ammonia dissociator to convert residual oxygen to moisture. The effluent stream from the ammonia dissociator containing less than 5 ppm of oxygen was then introduced into the transition zone of the furnace.

14-K gold samples annealed in this example were bright without any signs of oxidation. 9-K gold samples, on the other hand, showed some signs of surface oxidation. These results indicated that a $pH_2/pH_2O$ ratio of 1.5 in the effluent stream was high enough to be reducing to 14-K gold samples, but not high enough to be reducing to 9-K gold samples.

This example therefore showed that a mixture of hydrogen and non-cryogenically produced nitrogen containing residual oxygen can be used to replace nitrogen-hydrogen mixture produced by dissociation of ammonia for bright annealing gold alloys in a continuous furnace equipped with an ammonia dissociator provided that $pH_2/pH_2O$ ratio in the feed atmosphere to the furnace is high enough that it is reducing to gold alloys.

EXAMPLE 7A

Example 1 was repeated using the same furnace, annealing temperature, type of samples, composition of non-cryogenically produced nitrogen, and the amount of added hydrogen. The gaseous feed mixture was passed through the ammonia dissociator to convert residual oxygen to moisture. The effluent stream from the ammonia dissociator containing less than 5 ppm of oxygen is introduced into the heating zone rather than the transition zone of the furnace.

The copper samples annealed in this example were bright without any signs of oxidation. This example therefore shows that a mixture of hydrogen and non-cryogenically produced nitrogen containing residual oxygen can be used to replace nitrogen-hydrogen mixture produced by dissociation of ammonia for bright annealing copper in a continuous furnace equipped with an ammonia dissociator.

EXAMPLE 7B

Example 7A was repeated using the same furnace, annealing temperature, location of feed gas, and composition of non-cryogenically produced nitrogen with the exceptions of annealing 9-K and 14-K gold alloys and using 10% hydrogen. The gaseous feed mixture was once again passed through the ammonia dissociator to convert residual oxygen to moisture. The effluent stream from the ammonia dissociator containing less than 5 ppm of oxygen was introduced into the heating zone of the furnace.

The samples of gold alloys annealed in this example were bright without any signs of oxidation showing that a mixture of hydrogen and non-cryogenically produced nitrogen containing residual oxygen can be used to replace a nitrogen-hydrogen mixture produced by dissociation of ammonia for bright annealing gold alloys in a continuous furnace equipped with an ammonia dissociator.

EXAMPLE 7C

Example 7B is repeated using the same furnace, samples, annealing temperature, location of feed gas, and composition of non-cryogenically produced nitrogen with the exception of using 5% hydrogen. The gaseous feed mixture was passed through the ammonia dissociator to convert residual oxygen to moisture.

The samples of gold alloys annealed in this example are bright without any signs of oxidation indicating that a $pH_2/pH_2O$ ratio of 4.0 in the effluent stream is high enough to be reducing to both 9-K and 14-K gold samples.

This example therefore shows that a mixture of hydrogen and non-cryogenically produced nitrogen containing residual oxygen can be used to replace nitrogen-hydrogen mixture produced by dissociation of ammonia for bright annealing gold alloys in a continuous furnace equipped with an ammonia dissociator provided that $pH_2/pH_2O$ ratio in the feed atmosphere to the furnace is high enough that it is reducing to gold alloys.

EXAMPLE 7D

Example 7A is repeated twice using the same furnace, annealing temperature, and composition of non-cryogenically produced nitrogen with the exceptions of annealing carbon steel samples and using 1.5% hydrogen. The gaseous feed mixture was once again passed through the ammonia dissociator to convert residual oxygen to moisture. The effluent stream from the ammonia dissociator containing less than 5 ppm of oxygen was introduced into the transition zone of the furnace in the first experiment and into the heating zone in the second experiment.

The samples of carbon steels annealed in these experiments are noted to have a controlled, tightly packed oxide layer. This example therefore shows that a mixture of hydrogen and non-cryogenically produced nitrogen containing residual oxygen can be used to replace nitrogen-hydrogen mixture produced by dissociation of ammonia for controlled oxide annealing carbon steel samples in a continuous furnace equipped with an ammonia dissociator.

EXAMPLE 7E

Example 7D was repeated using the same furnace, annealing temperature, and composition of non-cryogenically produced nitrogen with the exception of using 5.0 hydrogen. The gaseous feed mixture was again passed through the ammonia dissociator to convert residual oxygen to moisture, and the effluent stream from the ammonia dissociator containing less than 5 ppm of oxygen was introduced into the transition zone of the furnace in the first experiment and into the heating zone in the second experiment.

The samples of carbon steels annealed in these experiments are bright without any signs of oxidation. This example therefore shows that a mixture of hydrogen and non-cryogenically produced nitrogen containing residual oxygen can be used to replace nitrogen-hydrogen mixture produced by dissociation of ammonia for bright annealing carbon steel samples in a continuous furnace equipped with an ammonia dissociator.

The above examples clearly show that a mixture of non-cryogenically produced nitrogen and hydrogen can be used to bright anneal copper, gold alloys, and carbon steels in a continuous furnace equipped with an ammonia dissociator provided $pH_2/pH_2O$ ratio in the effluent stream from the ammonia dissociator is reducing to the material being annealed. These examples also show that a mixture of non-cryogenically produced nitrogen and hydrogen can be used to controlled oxide anneal carbon steels in a continuous furnace equipped with an ammonia dissociator provided $pH_2/pH_2O$ ratio in the effluent stream from the ammonia dissociator is oxidizing to carbon steel.

A number of copper, gold alloys, and carbon steel annealing experiments are carried out in a continuous furnace equipped with an ammonia dissociator to demonstrate the present invention. A mixture of non-cryogenically produced nitrogen and vaporized methanol is passed through catalytic reactor of the ammonia dissociator operated at approximately 350° C. The reactor facilitates reaction between residual oxygen present in non-cryogenically produced nitrogen and methanol converting it to a mixture of moisture, carbon monoxide, carbon dioxide, and hydrogen depending upon the amount of hydrocarbon used. The feed mixture is preheated in a heat exchanger with hot effluent gas from the catalytic reactor. The effluent gas containing a mixture of nitrogen, hydrogen, moisture, carbon monoxide, carbon dioxide, and less than 5 ppm of residual oxygen is cooled in ambient air prior to introducing it into the transition or heating zone of the furnace. It is passed through the furnace for at least one hour to purge the furnace prior to annealing the samples.

EXAMPLE 8A

Samples of type 102 copper alloy were annealed at 760° C. in a furnace equipped with an ammonia dissociator using nitrogen containing 99.5% nitrogen and 0.5% oxygen and methanol mixture. The composition of nitrogen used in this example is very similar to that typically produced by non-cryogenic air separation techniques such as PSAs and membranes. The amount of vaporized methanol used in this example was about 0.6% by volume. The gaseous feed mixture was passed through the ammonia dissociator to convert residual oxygen to a mixture of moisture, carbon monoxide, and carbon dioxide. The effluent stream from the ammonia dissociator containing less than 5 ppm of oxygen was then introduced into the transition or heating zone of the furnace.

The copper samples annealed in this example are bright without any signs of oxidation. This example therefore shows that a mixture of hydrocarbon and non-cryogenically produced nitrogen containing residual oxygen can be used to replace nitrogen-hydrogen mixture produced by dissociation of ammonia for bright annealing copper in a continuous furnace equipped with an ammonia dissociator.

EXAMPLE 8B

Example 8A is repeated using the same furnace, annealing temperature, composition of non-cryogenically produced nitrogen, and the amount of vaporized methanol with the exception of annealing carbon steels. The gaseous feed mixture was passed through the ammonia dissociator to convert residual oxygen to a mixture of moisture, carbon monoxide, and carbon dioxide. The effluent stream from the ammonia dissociator containing less than 5 ppm of oxygen was introduced into the transition or heating zone of the furnace.

The carbon steel samples annealed in this example were oxidized with a tightly packed oxide layer. This example therefore shows that a mixture of hydrocarbon and non-cryogenically produced nitrogen containing residual oxygen can be used to replace nitrogen-hydrogen mixture produced by dissociation of ammonia for controlled oxide annealing carbon steels in a continuous furnace equipped with an ammonia dissociator.

EXAMPLE 8C

Example 8A is repeated using the same furnace, annealing temperature, and composition of non-cryogenically produced nitrogen with the exceptions of annealing copper, gold alloys, and carbon steel samples and adding 3.0% by volume vaporized methanol. The gaseous feed mixture was passed through the ammonia dissociator to convert residual oxygen to a mixture of moisture, carbon monoxide and carbon dioxide. The effluent stream from the ammonia dissociator containing less than 5 ppm of oxygen was introduced into the transition or heating zone of the furnace.

The copper, gold alloys, and carbon steel samples annealed in this example were bright without any signs of oxidation. This example therefore shows that a mixture of hydrocarbon and non-cryogenically produced nitrogen containing residual oxygen can be used to replace nitrogen-hydrogen mixture produced by dissociation of ammonia for bright annealing copper, gold alloys, and carbon steels in a continuous furnace equipped with an ammonia dissociator provided $pH_2/pH_2O$ and $pCO/pCO_2$ ratios in the effluent stream from the ammonia dissociator (or the stream entering the furnace) are reducing to the material being annealed.

The above examples clearly show that a mixture of non-cryogenically produced nitrogen and hydrocarbon can be used to bright anneal copper, gold alloys, and carbon steels in a continuous furnace equipped with an ammonia dissociator provided $pH_2/pH_2O$ and $pCO/pCO_2$ ratios in the effluent stream from the ammonia dissociator is reducing to the material being annealed. These examples also show that a mixture of non-cryogenically produced nitrogen and hydrocarbon can be used to controlled oxide anneal carbon steels in a continuous furnace equipped with an ammonia dissociator provided $pH_2/pH_2O$ and $pCO/pCO_2$ ratios in the effluent stream from the ammonia dissociator is oxidizing to carbon steels.

A number of copper, gold alloys, and carbon steel annealing experiments were carried out in a continuous furnace equipped with an ammonia dissociator to demonstrate the present invention. A mixture of non-cryogenically produced nitrogen and vaporized ammonia was passed through the catalytic reactor of the ammonia dissociator operated at approximately 950° C. The reactor facilitates dissociation of ammonia to a mixture of nitrogen and hydrogen, the reaction between residual oxygen present in non-cryogenically produced nitrogen and ammonia and/or hydrogen produced by dissociating ammonia, and production of a gaseous mixture containing moisture, nitrogen, and hydrogen depending upon the amount of ammonia used. The feed mixture was preheated in a heat exchange with hot effluent gas from the catalytic reactor. The effluent gas containing a mixture of nitrogen, hydrogen, moisture, and less than 5 ppm of residual oxygen was cooled in ambient air prior to introducing it into the transition or heating zone of the furnace. Effluent gas was passed through the furnace for at least one hour to purge the furnace prior to annealing the samples.

EXAMPLE 9A

Samples of type 102 copper alloy were annealed at 760° C. in a furnace equipped with an ammonia dissociator using nitrogen containing 99.5% nitrogen and 0.5% oxygen and ammonia mixture. The composition of nitrogen used in this example is very similar to that typically produced by non-cryogenic air separation techniques such as PSAs and membranes. The amount of vaporized ammonia used in this example is about 0.75% by volume. The gaseous feed mixture was passed through the ammonia dissociator to convert residual oxygen to a mixture of moisture. The effluent stream from the ammonia dissociator containing less than 5 ppm of oxygen was then introduced into the transition or heating zone of the furnace.

The copper samples annealed in this example were bright without any signs of oxidation. This example therefore shows that a mixture of ammonia and non-cryogenically produced nitrogen containing residual oxygen can be used to replace nitrogen-hydrogen mixture produced by dissociation of ammonia for bright annealing copper in a continuous furnace equipped with an ammonia dissociator.

EXAMPLE 9B

Example 9A was repeated using the same furnace, annealing temperature, composition of non-cryogenically produced nitrogen, and the amount of vaporized ammonia with the exception of annealing carbon steels. The gaseous feed mixture was passed through the ammonia dissociator to convert residual oxygen to moisture. The effluent stream from the ammonia dissociator containing less than 5 ppm of oxygen was introduced into the transition or heating zone of the furnace.

The carbon steel samples annealed in this example were oxidized with a tightly packed oxide layer. This example therefore shows that a mixture of ammonia and non-cryogenically produced nitrogen containing residual oxygen can be used to replace nitrogen-hydrogen mixture produced by dissociation of ammonia for controlled oxide annealing carbon steels in a continuous furnace equipped with an ammonia dissociator.

EXAMPLE 9C

Example 9A was repeated using the same furnace, annealing temperature, and composition of non-cryogenically produced nitrogen with the exceptions of annealing copper, gold alloys, and carbon steel samples and adding 3.0% by volume vaporized ammonia. The gaseous feed mixture was passed through the ammonia dissociator to convert residual oxygen to moisture. The effluent stream from the ammonia dissociator containing less than 5 ppm of oxygen was introduced into the transition or heating zone of the furnace.

The copper, gold alloys, and carbon steel samples annealed in this example were bright without any signs of oxidation. This example therefore shows that a mixture of ammonia and non-cryogenically produced nitrogen containing residual oxygen can be used to replace nitrogen-hydrogen mixture produced by dissociation of ammonia for bright annealing copper, gold alloys, and carbon steels in a continuous furnace equipped with an ammonia dissociator provided $pH_2/pH_2O$ ratio in the effluent stream from the ammonia dissociator (or the stream entering the furnace) are reducing to the material being annealed.

The above examples clearly show that a mixture of non-cryogenically produced nitrogen and ammonia can be used to bright anneal copper, gold alloys, and carbon steels in a continuous furnace equipped with an ammonia dissociator provided $pH_2/pH_2O$ ratio in the effluent stream from the ammonia dissociator is reducing to the material being annealed. These examples also show that a mixture of non-cryogenically produced nitrogen and ammonia can be used to controlled oxide anneal carbon steels in a continuous furnace equipped with an ammonia dissociator provided $pH_2/pH_2O$ ratio in the effluent stream from the ammonia dissociator is oxidizing to carbon steels.

Having thus described our invention what is desired to be secured by Letters Patent of the United States is set forth in the following claims.

We claim:

1. A method for generating a controlled atmosphere for a heat treating furnace comprising the steps of:
    mixing non-cryogenically produced nitrogen containing up to five percent by volume oxygen with a reducing gas selected from the group consisting of hydrogen, ammonia, C, H and O containing hydrocarbons and mixtures thereof, said reducing gas being present in an amount greater than stoichiometry dictates for reaction with said oxygen to convert said oxygen to moisture, carbon dioxide, and mixtures thereof;
    passing said mixture through an ammonia dissociator having a bed of catalyst selected from the group consisting of nickel, iron and mixtures thereof heated to a temperature of between 100° C. and 950° C. to permit said reducing gas to react and convert residual oxygen to moisture, carbon dioxide and mixtures thereof;
    collecting an effluent gas from said ammonia dissociator and injecting said effluent into said heat treating furnace.

2. A process according to claim 1 wherein said reducing gas is a C, H, O containing hydrocarbon selected from the group consisting of alcohols, ethers, aldehydes, ketones, acetone and mixtures thereof.

3. A process according to claim 1 wherein the oxygen in the mixture is reduced to less than 10 ppm in the ammonia dissociator.

4. A process according to claim 1 wherein the $pH_2/pH_2O$ ratio in the ammonia dissociator effluent is adjusted so the atmosphere in the furnace is oxidizing to carbon and alloy steels.

5. A process according to claim 1 wherein the $pH_2/pH_2O$ ratio in the ammonia dissociator effluent is adjusted so that the atmosphere in the furnace is non-oxidizing to carbon and alloy steels.

6. A process according to claim 1 wherein the $pH_2/pH_2O$ ratio or $pCO/pCO_2$ ratios or both in the ammonia dissociator effluent is adjusted so that the atmosphere in the furnace is oxidizing to carbon and alloy steels.

7. A process according to claim 1 wherein the $pH_2/pH_2O$ and $pCO/pCO_2$ ratios in the ammonia dissociator effluent are adjusted so that the atmosphere in the furnace is non-oxidizing to carbon and alloy steels.

8. A process according to claim 1 wherein the $pH_2/pH_2O$ or $pCO/pCO_2$ or both in the ammonia dissociator effluent are adjusted so that the furnace atmosphere is non-oxidizing when the furnace is used to braze metals, braze ceramics, seal glass to metal, sinter metals, sinter ceramics, co-fire ceramics, ceramic metallization and heating treating of non-ferrous metals and alloys.

* * * * *

UNITED STATES PATENT AND TRADEMARK OFFICE
CERTIFICATE OF CORRECTION

PATENT NO. : 5,322,676
DATED : June 21, 1994
INVENTOR(S) : M. J. Epting, et al It is certified that error appears in the above-identified patent and that said Letters Patent is hereby corrected as shown below:

On the title page, item:

[75] Inventors: should be

Michael J. Epting, Palm Harbor, Fla.
    Michael J. Stempo, Bethlehem, Pa.
    Brian B. Bonner, Nesquehoning, Pa.
    Diwakar Garg, Macungie, Pa.

Signed and Sealed this

Twentieth Day of September, 1994

Attest:

BRUCE LEHMAN

*Attesting Officer*  *Commissioner of Patents and Trademarks*